United States Patent
Buchmuller et al.

[11] 3,721,302
[45] March 20, 1973

[54] DRAFT LINK SWAY LIMITING DEVICE

[75] Inventors: Josef Buchmuller; Otto Hartlieb, both of Mannheim, Germany

[73] Assignee: Deere & Company, Moline, Ill.

[22] Filed: March 13, 1972

[21] Appl. No.: 234,115

[30] Foreign Application Priority Data

Sept. 16, 1971  Germany....................G 71 35 201.7

[52] U.S. Cl..............................172/450, 280/474
[51] Int. Cl..............................................A01b 59/043
[58] Field of Search..............172/450, 449, 457, 501; 280/497, 474

[56] References Cited

UNITED STATES PATENTS

| | | | |
|---|---|---|---|
| 3,627,060 | 12/1971 | Lemmon | 172/450 |
| 3,047,076 | 7/1962 | Wier et al. | 172/450 |
| 2,987,126 | 6/1961 | Horney | 172/450 |
| 2,935,147 | 5/1960 | Edman et al. | 172/450 |

Primary Examiner—Robert E. Pulfrey
Assistant Examiner—Stephen C. Pellegrino
Attorney—H. Vincent Harsha et al.

[57] ABSTRACT

An arcuate-shaped channel member is secured to the side of the tractor with its legs projecting toward and for engagement with the tractor draft link. The legs of the channel member prevent lateral movement of the draft link when in the upper position and permit limited lateral movement of the draft link when in the lower position. An arcuate-shaped guide member between the legs of the channel member is movable between an upper position in which its outer surface is in alignment with the legs of the channel member and a lower position in which its outer surface projects outwardly beyond the legs of the channel member to engage and prevent lateral movement of the draft link when the draft link is in the lower position.

9 Claims, 3 Drawing Figures

PATENTED MAR 20 1973 3,721,302

DRAFT LINK SWAY LIMITING DEVICE

BACKGROUND OF THE INVENTION

The present invention relates generally to agricultural implements and more particularly relates to a tractor three-point hitch for connecting an implement to an associated supporting tractor.

In certain types of three-point hitch tractor-mounted agricultural implements, it is desirable that the implement, when lowered, be allowed to sway from side to side independently of the movement of the tractor. Side sway or lateral movement, however, must be controlled and limited so as not to allow interference with the rear drive wheels of the tractor and, it is desirable that such side sway be reduced to practically nil when the implement is raised to a transport position so as to provide an arrangement that is stable and safe for transporting purposes. In certain other types of agricultural implements, it is desirable that the implement be restricted from any side sway throughout its working range.

There are many known devices for limiting the sway of the tractor draft links so that the tractor draft links could selectively have no sway or limited sway when in the lower position, but these devices have been relatively complicated and the adjustment required when converting from the no-sway to the limited sway condition or vice versa has been time consuming.

SUMMARY OF THE INVENTION

The principal object of the present invention is the provision of a simple sway limiting device which is easily converted from a no-sway condition to a limited sway condition or vice versa.

Another object of the present invention is to provide a channel guide member of generally arcuate shape formed about the pivot axis of the tractor draft link, the legs of the channel member providing a guide surface for engagement with the tractor draft link to provide limited sway when the draft links are in the lower position and no-sway when the tractor draft links are in an upper position, and a guide block positioned between the legs of the channel member and movable from an upper position in which it is housed entirely between the legs of the channel member and a lower position in which it projects beyond the legs of the channel member to engage and prevent sway of the draft link.

The above and additional objects and advantages of the present invention will become apparent to those skilled in the art from a consideration of the following detailed description when taken in conjunction with the accompanying drawing.

DESCRIPTION OF THE PREFERRED EMBODIMENT

Figure 2:
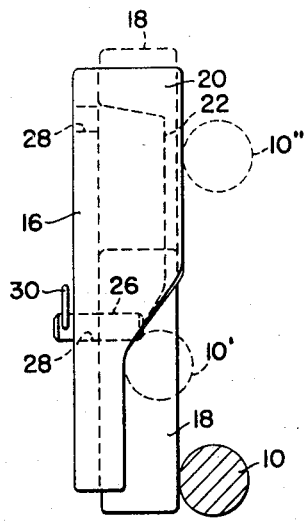
FIG. 2 is a rear elevational view of the device illustrated in FIG. 1.

In the drawing, only one sway limiting device according to the invention is illustrated with one tractor draft link, but those skilled in the art will realize that a tractor three-point hitch includes a pair of draft links and that two of the sway limiting devices will be required.

Referring now to the drawing, a tractor draft link 10 is illustrated as being pivotally connected to the rear portion of a tractor gear case 12 for both vertical and lateral swinging movement about a ball 14. The sway limiting device includes a first guide member 16 and a second guide member 18.

The first guide member is of channel shape having a pair of legs 20 and 22, and is provided with an integral flange portion 24 which serves to mount the first guide member on the gear case 12 of the tractor. The legs 20 and 22 of the first guide member provide a guide surface which has a first upwardly extending portion, a second upwardly and outwardly extending ramp portion diverging from the upper end of the first portion, and a third portion extending upwardly from the upper end of the second portion. As can be seen from FIG. 1, the legs 20 and 22 of the first guide member or channel member are of arcuate shape formed about the axis of vertical swinging movement of the draft link, and as can be seen from FIG. 3, the rear leg 20 extends outwardly a greater distance than does the front leg 22 since the draft link 10 does not extend directly rearwardly but also extends outwardly.

The guide surface provided by the legs 20 and 22 will prevent any lateral movement or sway in the draft link 10 when the draft link is in the upper position and permits limited lateral movement when the draft link is in the lower position. This will be more fully explained hereinafter.

Figure 1:
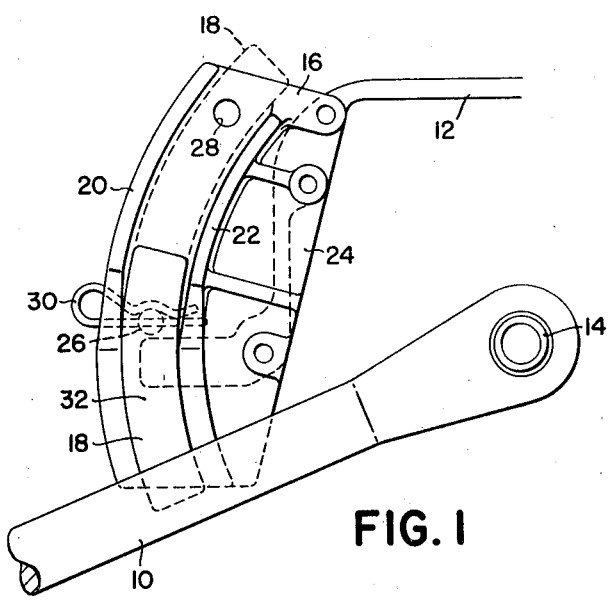
FIG. 1 is a side elevational view of a draft link sway limiting device, one part of the device being shown in an alternate position in dotted lines.
Figure 3:
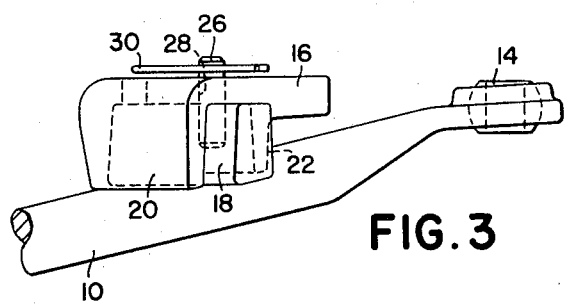
FIG. 3 is a top plan view of the device illustrated in FIG. 1.

The guide member 18 is formed as a solid block of arcuate shape complementary to the arcuate shape of the legs 20 and 22 and is secured between the legs 20 and 22 in either a lower position illustrated by solid lines in FIGS. 1 and 2 or an upper position illustrated by broken lines in FIGS. 1 and 2 and solid lines in FIG. 3. A pin 26 is secured to the guide member 18 in any suitable manner and extends through either one of a pair of upper and lower apertures 28 provided in the bight of the channel member to hold the guide member 18 in either its upper or lower position. A spring cotter pin 30 extends through a drop-in hole provided in the outer end of the pin 26 to prevent inadvertent removal of the pin 26. The guide member 18 is dimensioned so that its outer face 32 is in alignment with the upper portion of the guide surface provided by the legs 20 and 22 as can best be seen in FIGS. 2 and 3.

Three alternate positions 10, 10' and 10'' of the draft link are illustrated in FIG. 2. When the second guide member 18 is in its lower position, the draft link is prevented from lateral movement over its entire range of vertical movement as is indicated by the positions 10 and 10'' in FIG. 2. When the draft link 10 is in a lower position, the second guide member 18 engages the draft link to prevent lateral movement and when the draft link is in its upper position, the legs of the channel member engage the draft link to prevent lateral movement. When the second guide member 18 is in its upper position illustrated by the broken lines in FIGS. 1 and 2, the draft link 10 has limited lateral movement when in a lower position as indicated by the position 10'. As can be seen from the drawing, the second guide member 18 is easily moved between its alternate positions by removing the spring cotter pin 30, moving the guide member 18 to its other position, and replacing the spring cotter pin 30.

From the drawing and the foregoing description, it can be seen that the present invention provides a very simple sway limiting device which is easily adjusted for limited or no-sway of the draft link when the draft link is in its lower position.

Although only a single preferred embodiment of the invention has been described and illustrated, various modifications within the spirit and scope of the invention will become apparent to those skilled in the art and can be made without departing from the underlying principles of the invention.

We claim:

1. In an implement hitch for a tractor having a draft link swingable both laterally and vertically relative to the tractor, sway limiting means adapted to be disposed between the tractor and draft link comprising: a channel member secured to the tractor in a generally upright attitude with its legs extending toward the draft links; the legs of the channel member presenting a lower guide surface and an upper guide surface offset laterally outwardly from the lower guide surface and interconnected with the lower guide surfaces by a ramp surface; a guide block positioned in the channel member and having a guide face in alignment with the upper guide surface; and means to lock the guide block in either an upper position between the legs of the upper portion of the channel member and a lower position in which its guide face forms a lower continuation of the upper guide face.

2. The combination as set forth in claim 1 wherein the channel member is generally of arcuate shape formed about the axis of movement of the draft link, and the guide block is of a complementary arcuate shape.

3. The combination as set forth in claim 1 wherein the guide member has a vertical dimension greater than the combined vertical dimensions of the lower guide surface and ramp surface.

4. The combination as set forth in claim 3 wherein the bight of the channel member is provided with upper and lower apertures, and the means to lock the guide member in either its upper and lower position includes pin means carried by the guide members and insertable through a selected one of the apertures.

5. In an implement hitch for a tractor having a fore-and-aft extending draft link pivotally mounted at its forward end on a rear portion of the tractor for lateral and vertical swinging movement means for limiting the lateral swinging of the draft link comprising: a first elongated guide member secured to the tractor in a generally vertical attitude and having a guide surface facing the draft link; the guide surface having a first upwardly extending portion, a second portion extending upwardly and outwardly diverging from the upper end of the first portion, and a third portion extending upwardly from the second portion; a second guide member having a guide surface in alignment with the third portion of the guide surface of the first guide member; and means to selectively secure the second guide member to the first guide member in a first position above the second portion and a second portion overlapping the first and second portions.

6. A combination as set forth in claim 5 wherein the vertical dimension of the guide surface of the second guide member is greater than the combined vertical dimensions of the first and second portions of the guide surface of the first guide member.

7. A combination as set forth in claim 6 wherein the first and second guide members are generally of arcuate shape formed above the axis of vertical swinging movement of the draft link.

8. A combination as set forth in claim 7 wherein the first guide member is formed as a channel whose legs constitute the guide surface, and the second guide member is a guide block positioned between the legs of the channel.

9. The combination as set forth in claim 8 wherein the bight of the channel is provided with upper and lower apertures, and the means to lock the guide block in either the first or second positions includes pin means carried by the guide block and insertable through a selected one of the apertures.

* * * * *